United States Patent
Zargari et al.

(10) Patent No.: US 11,437,938 B2
(45) Date of Patent: Sep. 6, 2022

(54) SYSTEMS AND METHODS OF MULTI-MOTOR REGENERATIVE DRIVE

(71) Applicant: Rockwell Automation Technologies, Inc., Mayfield Heights, OH (US)

(72) Inventors: Navid R. Zargari, Cambridge (CA); Zhongyuan Cheng, Kitchener (CA); Mehdi Narimani, Oakville (CA); Ahmed Hisham Abuelnaga, Hamilton (CA)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 17/035,889

(22) Filed: Sep. 29, 2020

(65) Prior Publication Data

US 2022/0103098 A1     Mar. 31, 2022

(51) Int. Cl.
  *H02P 5/74*    (2006.01)
  *H02M 7/487*   (2007.01)
  *H02M 7/49*    (2007.01)

(52) U.S. Cl.
  CPC .............. *H02P 5/74* (2013.01); *H02M 7/487* (2013.01); *H02M 7/49* (2013.01)

(58) Field of Classification Search
  CPC ............ H02P 5/74; H02M 7/487; H02M 7/49
  See application file for complete search history.

(56) References Cited

U.S. PATENT DOCUMENTS

| | | | | |
|---|---|---|---|---|
| 4,263,535 A | * | 4/1981 | Jones | E02F 9/123 318/400.23 |
| 6,229,722 B1 | | 5/2001 | Ichikawa | |
| 6,320,767 B1 | | 11/2001 | Shimoura | |
| 8,541,962 B2 | * | 9/2013 | Sato | G01R 31/42 318/49 |
| 8,941,348 B2 | * | 1/2015 | Mirzaei | H02H 3/253 318/778 |
| 9,831,846 B2 | | 11/2017 | Cheng | |
| 2010/0072824 A1 | * | 3/2010 | Abolhassani | H02M 7/49 307/82 |
| 2010/0176755 A1 | * | 7/2010 | Hoadley | H02P 27/06 363/5 |

(Continued)

FOREIGN PATENT DOCUMENTS

EP     2782240 A2     9/2014

OTHER PUBLICATIONS

European Patent Office, "Communication pursuant to Rule 62 EPC, Extended European Search Report", application No. 21197689.9 EPO, dated Jan. 31, 2022, 10 pages.

*Primary Examiner* — Rina I Duda

(57) ABSTRACT

A system is provided for driving multiple motors. The system includes multiple cascaded H-bridge (CHB) power inverters, a DC bus, and multiple neutral point converter/inverters. Each of the multiple CHB power inverters is connected to a respective motor at one or more AC terminals of the CHB power inverter. Each of the multiple CHB power inverters includes one or more DC terminals configured to receive DC power. Each of the multiple neutral point converter/inverters is connected to a respective CHB power inverter at one or more neutral terminals of the respective CHB power inverter and connected to the DC bus.

20 Claims, 16 Drawing Sheets

(56) References Cited

U.S. PATENT DOCUMENTS

| | | | |
|---|---|---|---|
| 2011/0175579 A1* | 7/2011 | Mazumdar | B60R 16/033 |
| | | | 320/167 |
| 2012/0268099 A1 | 10/2012 | Sihler | |
| 2016/0126869 A1* | 5/2016 | Simms | H02J 3/18 |
| | | | 318/376 |
| 2018/0287541 A1* | 10/2018 | Wang | H02P 25/20 |

* cited by examiner

SYSTEMS AND METHODS OF MULTI-MOTOR REGENERATIVE DRIVE

TECHNICAL FIELD

This application relates generally to a motor drive system, and more particularly to a multi-motor regenerative drive system.

BACKGROUND

In some industrial applications, it is economical and efficient to drive multiple motors by a single drive system rather than implementing individual drive/motor systems. The conventional single drive systems utilize a pair of inverter and converter to drive each motor. In order to drive multiple motors, multiple pairs of inverters and converters are used in the single drive system. It is advantageous to provide a single multi-motor drive system that eliminates some of the converters and provides regenerative energy to optimize efficiency, increase flexibility and reduce costs and space.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

One embodiment is a system for driving multiple motors. The system includes multiple cascaded H-bridge (CHB) power inverters, a DC bus, and multiple neutral point converter/inverters. Each of the multiple CHB power inverters is connected to a respective motor at one or more AC terminals of the CHB power inverter. Each of the multiple CHB power inverters includes one or more DC terminals configured to receive DC power. Each of the multiple neutral point converter/inverters is connected to a respective CHB power inverter at one or more neutral terminals of the respective CHB power inverter and connected to the DC bus.

Another embodiment is a system for driving multiple motors. The system includes a first cascaded H-bridge (CHB) power inverter connected between a first motor and a first neutral point converter/inverter, a second CHB power inverter connected between a second motor and a second neutral point converter/inverter, and a direct current (DC) bus. The first motor is configured to operate in a driving mode. The second motor is configured to operate in a regenerative mode. The DC bus is connected to the first and the second neutral point converter/inverters. The first CHB power inverter is configured to: receive DC power from a power supply and/or alternating current (AC) power from the first neutral point converter/inverter, convert the DC power to AC power, and provide AC power to the first motor. The second CHB power inverter is configured to: receive regenerative power from the second motor, and direct the regenerative power to the second neutral point converter/inverter. The second neutral point converter/inverter is configured to convert the regenerative power to DC power and provide the DC power to the DC bus.

Another embodiment is a method of controlling a multi-motor drive system. The method includes: determining an operating mode for each of multiple motors; in response to determining that one or more first motors of the multiple motors operate in a regenerative mode, providing regenerative power from the one or more first motors to a direct current (DC) bus through one or more respective first cascaded H-bridge (CHB) power inverters and one or more respective first neutral point converter/inverters connected between the one or more first motors and the DC bus; and in response to determining that one or more second motors of the multiple motors operate in a driving mode, providing power to the one or more second motors from a power supply and from the DC bus.

The following description and annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that certain passages of this disclosure can reference terms such as "first" and "second" in connection with ends, materials, etc., for purposes of identifying or differentiating one from another or from others. These terms are not intended to merely relate entities (e.g., a first end and a second end) temporally or according to a sequence, although in some cases, these entities can include such a relationship. Nor do these terms limit the number of possible entities (e.g., materials) that can operate within a system or environment.

Figure 1:
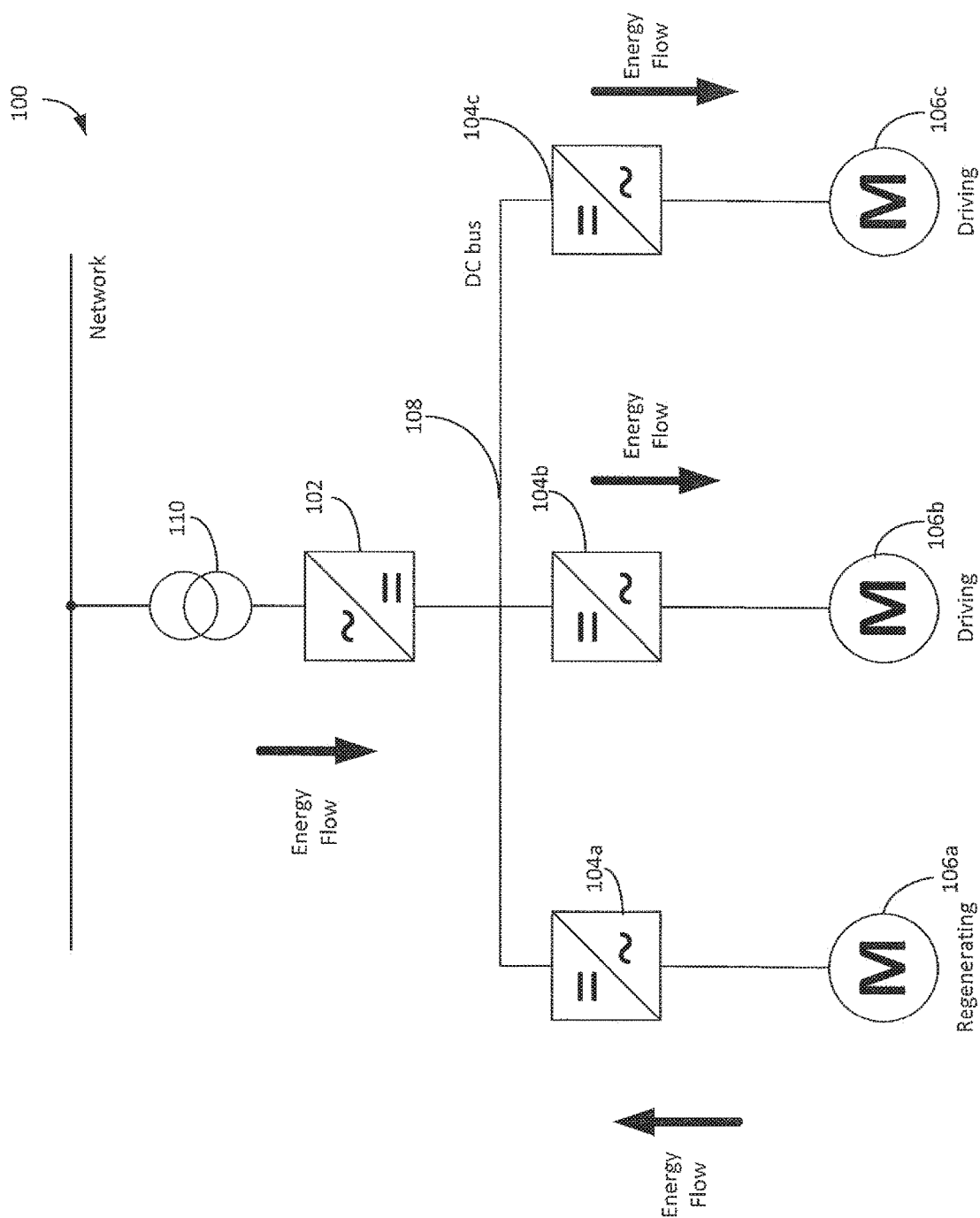
FIG. 1 is a schematic diagram of a multi-motor regenerative drive system according to an illustrative embodiment.

FIG. 1 is a schematic diagram of a multi-motor regenerative drive system 100 according to an illustrative embodiment. The multi-motor regenerative drive system 100 includes a converter/inverter 102, multiple converter/inverters 104 (e.g., converter/inverters 104a, 104b, and 104c), and a direct current (DC) bus 108. The converter/inverter 102 receives alternating current (AC) from an energy source 110 and converts the AC to DC. The DC is provided from the converter/inverter 102 to the DC bus 108. The DC bus 108 may include multiple electrical lines that connect the converter/inverter 102 with the converter/inverters 104. Each converter/inverter 104 is connected to a motor 106 to provide power to drive the motor 106 or receive regenerative power from the motor 106. When the motors 106 (e.g., motors 106b and 106c) operate in a driving mode, the respective converter/inverters 104 (e.g., inverters 104b and 104c) receive DC from the converter 102 and convert the DC to AC and further provide the AC to the respective motors 106. The converter/inverters 104 can also be used as neutral point converters (e.g., the neutral point converter 104a) when the respective motors 106 (e.g., the motor 106a) operate in a regenerating mode and/or brake mode. The neutral point converters 104 receive AC from the motors 106, convert the AC to DC, and provide the DC to other motors (e.g., motors 106b and 106c) that operate in the driving mode. In some embodiments, the regenerative power may be directed from the neutral point converters 104 to the converter/inverter 102 and further to the energy source 110. The converter/inverter 102 and the neutral point converter 104 can be any suitable converter or inverters, such as, cascaded H-bridge (CHB) power converters, neutral point clamped converters (NPC), etc.

Figure 2A:
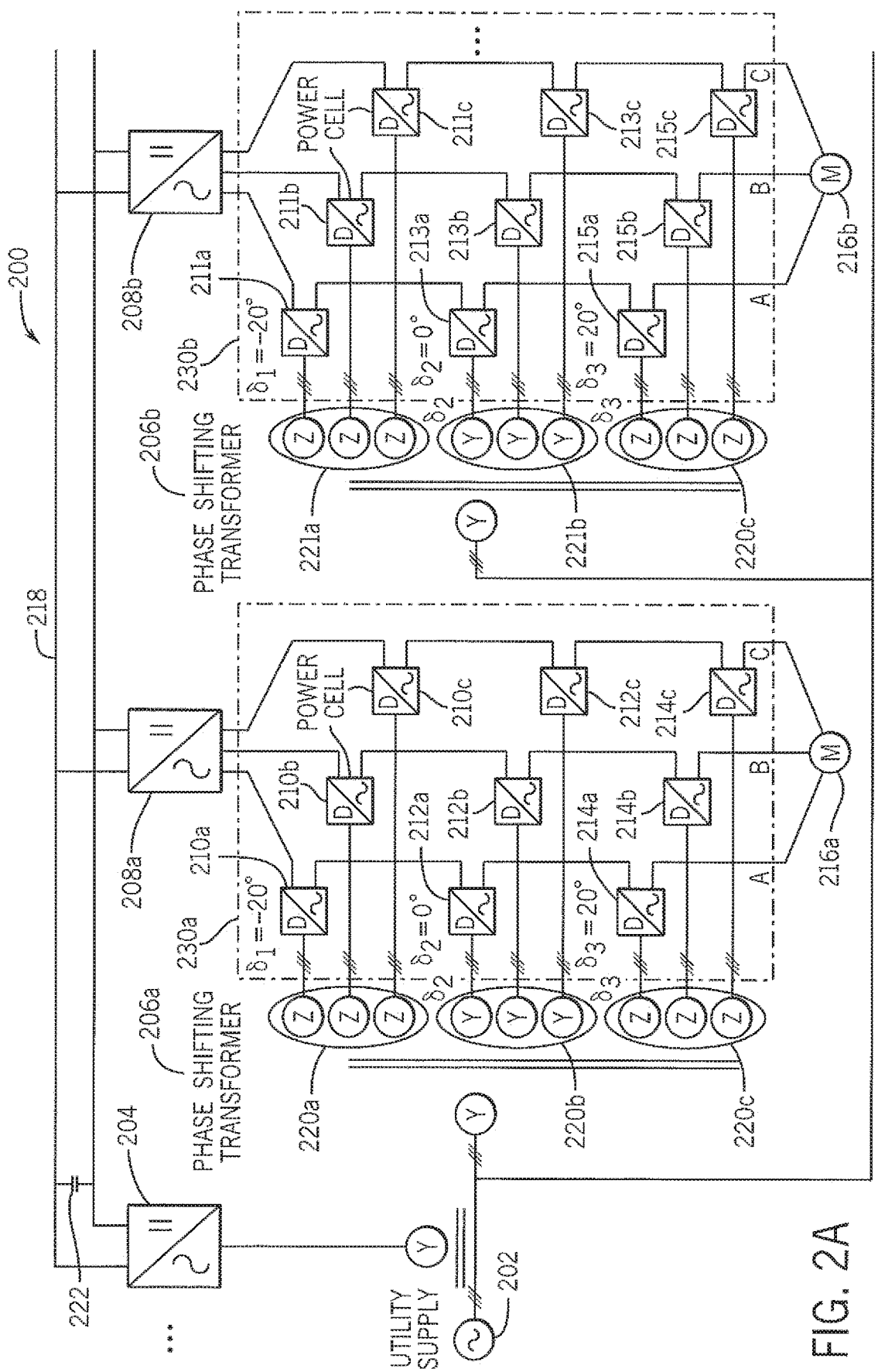
FIG. 2A is a schematic diagram of a multi-motor regenerative drive system according to an illustrative embodiment.

FIG. 2A is a schematic diagram of a multi-motor regenerative drive system 200 according to an illustrative embodiment. The multi-motor regenerative drive system 200 is configured to provide power to one or more motors that operate in a driving mode and/or receive power from one or more motors that operate in a regenerative mode. The multi-motor regenerative drive system 200 includes a power supply 202, a grid connection converter/inverter 204, two or more neutral point converter/inverters 208 (e.g., a neutral point converter/inverter 208a, a neutral point converter/inverter 208b), two or more phase shifting transformers 206 (e.g., phase shifting transformers 206a and 206b), two or more cascaded H-bridge (CHB) power inverters 230 (e.g., cascaded H-bridge power inverters 230a and 230b), and a DC bus 218.

The power supply 202 is connected to the two or more phase shifting transformers 206. Each of the phase shifting transformers 206 is connected to one or more first terminals (e.g., input terminals) of a CHB power inverter 230. Each CHB power inverter 230 is connected to a motor 216 at one or more second terminal (e.g., output terminals). Each CHB power inverter 230 is connected to a neutral point converter 208 at one or more third terminals (e.g., neutral terminals). The CHB power inverters 230 can be any suitable CHB power inverters, such as the CHB power inverters as disclosed in U.S. Pat. No. 9,831,846 (incorporated by reference herein). In some embodiments, each CHB power inverter 230 (e.g., inverter 230a) includes three sets of inverters (e.g., power cells). Each set of inverters includes three inverters (e.g., a first set of inverters 210a, 212a, 214a, a second set of inverters 210b, 212b, 214b, a third set of inverters 210c, 212c, 214c) connected in series and is connected to a terminal (e.g., terminals A, B, C) of the output terminals of the CHB power inverter 230. Each CHB power inverter 230 converts power received from the power supply 202 through a respective phase shifting transformer 206 and provides the power to a respective motor 216 when the respective motor 216 operates in a driving mode. When a respective motor 216 operates in a regenerative mode (e.g., during braking), the CHB power inverter 230 does not convert power received from the power supply through the respective phase shifting transformer 206 and instead, allows power received from a respective motor 216 to pass through the CHB inverter 230 to the neutral terminal that is connected to a respective neutral point converter/inverter 208.

Each neutral point converter/inverter 208 is connected between a respective CHB power inverter 230 and the DC bus 218. For example, the neutral point converter/inverter 208a is connected to three neutral terminals of the CHB power inverter 230a at a first end and is connected to the DC bus 218 at a second end. Similarly, the neutral point converter/inverter 208b is connected to three neutral terminals of the CHB power inverter 230b at a first end and is connected to the DC bus 218 at a second end. It should be understood that even though two motors 216a and 216b are shown, the multi-motor regenerative drive system 200 can drive multiple motors in a similar way as described herein.

In some embodiments, the multi-motor regenerative drive system 200 includes one or more controllers (not shown) that each converter and/or inverters in order to control power flow through the system so that the system 200 provides power to drive a motor that operates in a driving mode and collects power from a motor that operates in a regenerative mode. The one or more controllers control each neutral point converter/inverter to operate as a converter or an inverter based on an operating mode of a respective motor that is connected to the neutral point converter/inverter through a respective CHB power inverter. Each converter/inverter can also be configured by the one or more controllers to generate active power and/or reactive power to drive the motors. In some embodiments, each converter/inverter is associated with a controller so that each converter/inverter is independently controlled and no central control is needed.

Each of the neutral point converter/inverters 208 is configured to operate as a converter to convert AC power input from a respective motor 216 to DC power and output the DC power to the DC bus 218 when the respective motor 216 operates in a regenerative mode. Each of the neutral point converter/inverters 208 is configured to operate as an inverter to convert DC power input from another motor 216 through the DC bus 218 to AC power and output the AC power to a respective motor 216 that operates in a driving mode. The DC bus 218 includes a capacitor 222.

The power supply 202 provides AC power to the phase shifting transformer 206a and the phase shifting transformer 206b. In some embodiments, the AC power from the power supply 202 is three-phase AC power. The phase shifting transformers 206a and 206b may be three-phase transformers that shifts the three-phase AC power with three different shifting angles to generate three AC power output groups (e.g., AC output groups 220a and 221a with a 20-degree phase shifting angle, AC output groups 220b and 221b with a 0-degree phase shifting angle, AC output groups 220c and 221c with a minus 20-degree phase shifting angle). The phase shifting transformers 206a and 206b are configured to cancel specific harmonics in the line current. Each AC output group is converted to DC powers and provided to the CHB power inverter 230. For example, in some embodiments, each AC output group includes three outputs. Each output of the AC output group is associated with a single phase power. For example, the three-phase AC output group 220a is converted to DC powers and provided to the inverters 210a, 210b, and 210c. The three-phase AC output group 220b is converted to DC powers and provided to the inverters 212a, 212b, and 212c. The three-phase AC output group 220c is converted to DC powers and provided to the inverters 214a, 214b, and 214c. The three-phase AC output group 221a is converted to DC powers and provided to the inverters 211a, 211b, and 211c. The three-phase AC output group 221b is converted to DC powers and provided to the inverters 213a, 213b, and 213c. The three-phase AC output group 221c is converted to DC powers and provided to the inverters 215a, 215b, and 215c. Each of the inverters 210a, 210b, 210c, 212a, 212b, 212c, 214a, 214b, 214c has a first terminal (e.g., neutral terminal) that connects to the neutral point converter 208a and a second terminal that connects to the motor 216a. Similarly, each of the inverters 211a, 211b, 211c, 213a, 213b, 213c, 215a, 215b, 215c has a first terminal (e.g., neutral terminal) that connects to the neutral point converter 208b and a second terminal that connects to the motor 216b.

Figure 2B:
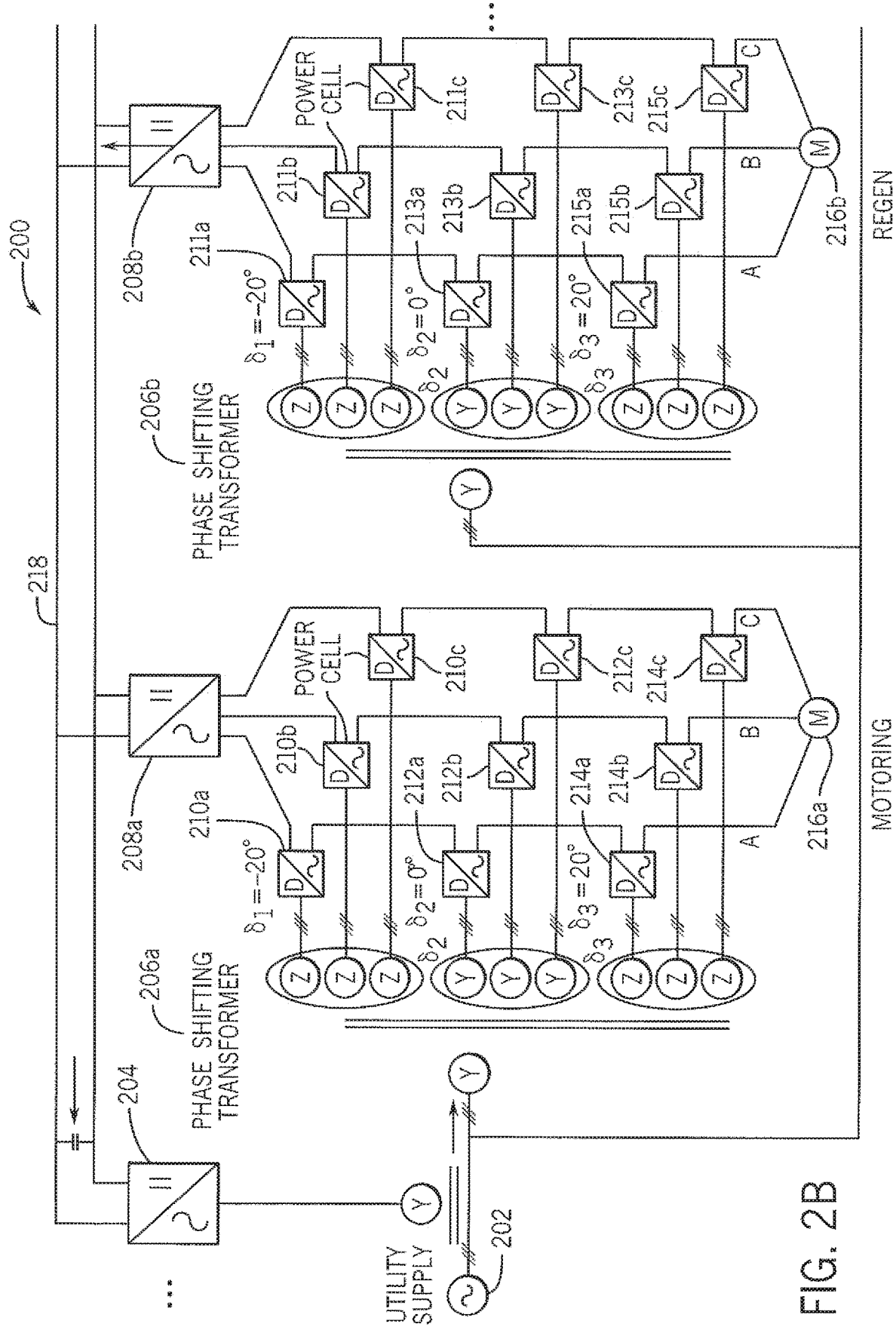
FIG. 2B is a schematic diagram showing regenerative energy flow within the multi-motor regenerative drive system of FIG. 2A according to an illustrative embodiment.
Figure 2C:
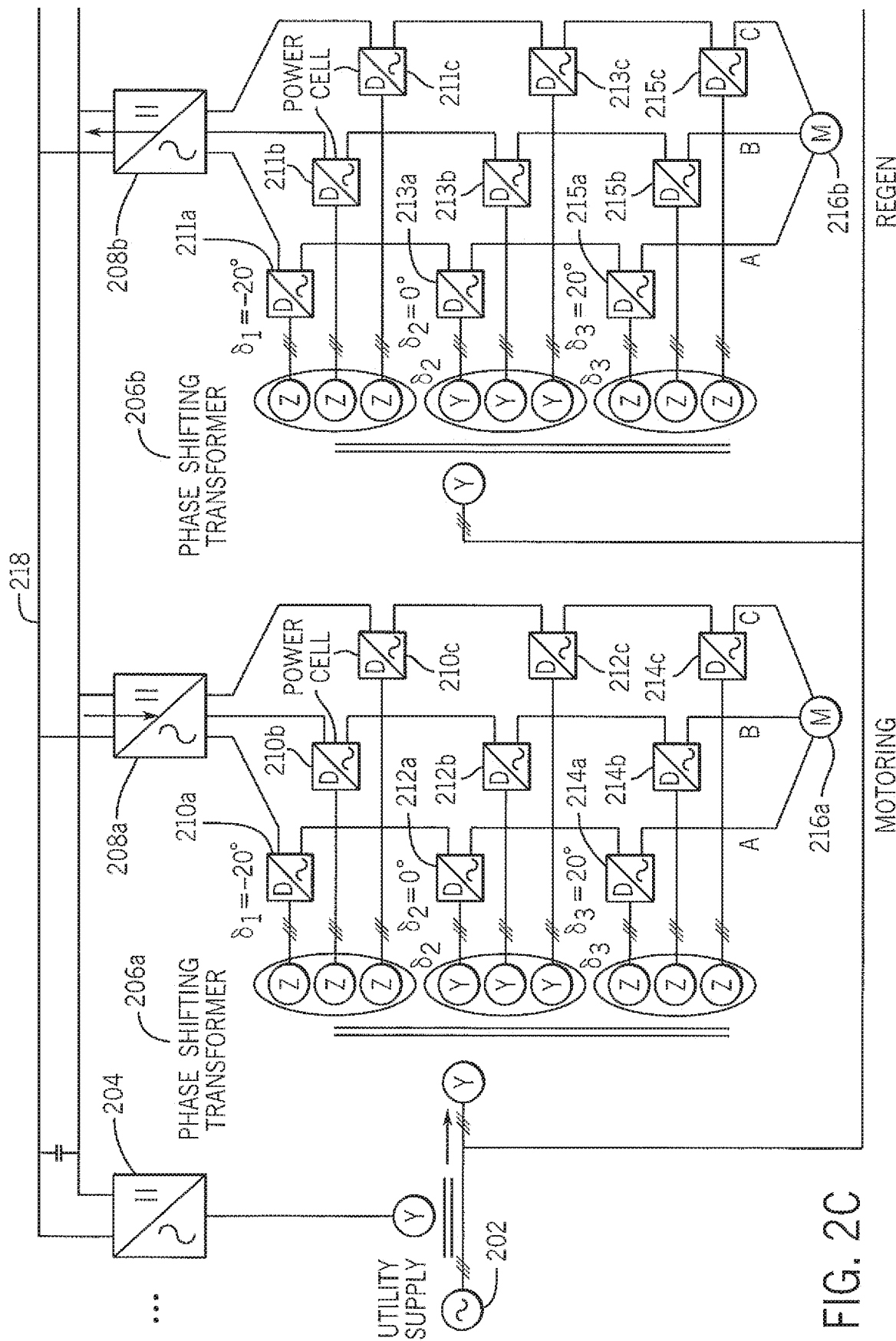
FIG. 2C is a schematic diagram showing regenerative energy flow within the multi-motor regenerative drive system of FIG. 2A according to an illustrative embodiment.

When one or more motors (e.g., the motor 216a) as shown in FIG. 2B and FIG. 2C operates in a driving mode (e.g., operates motoring), the multi-motor drive system 200 provides AC power through the three-phase shifting transformer 206a to the CHB power inverter 230a to convert the AC power to DC power. The CHB power inverter 230a provides the DC power to the motor 216a.

When one or more motors (e.g., the motor 216b) as shown in FIG. 2B and FIG. 2C operates in a regenerative mode, the motor 216b provides regenerative power to the CHB inverter 230b. The CHB inverter 230b allows the regenerative power from the motor 216b to pass and provides the regenerative power to the neutral point converter/inverter 208b through the neutral terminal. In one or more embodiments as shown in FIG. 2B, the regenerative power from the motor 216b is converted to DC power via the neutral point converter 208b. The converted DC power is provided to the DC bus 218 and further provided to the grid connection converter/inverter 204. The grid connection converter/inverter 204 converts the DC power to AC power and provides the AC power as power supply to be combined with power from the power supply 202 to input power to the multi-motor regenerative drive system 200.

In one or more other embodiments as shown in FIG. 2C, the regenerative power from the motor 216b is provided to the neutral point converter 208b through the CHB power inverter 203b and converted to DC power via the neutral point converter 208b. The converted DC power is provided to the DC bus 218 and further provided to the neutral point converter/inverter 208a. The neutral point converter/inverter 208a converts the DC power from the DC bus 218 to AC power and provides the AC power to drive the motor 216a that operates in the driving mode.

In some embodiments, a first portion of the regenerative power from a motor that operates in a regenerative mode can be provided to one or more other motors that operate in a driving mode and a second portion of the regenerative power from the motor can be provided to power supply to the drive system.

Figure 3:
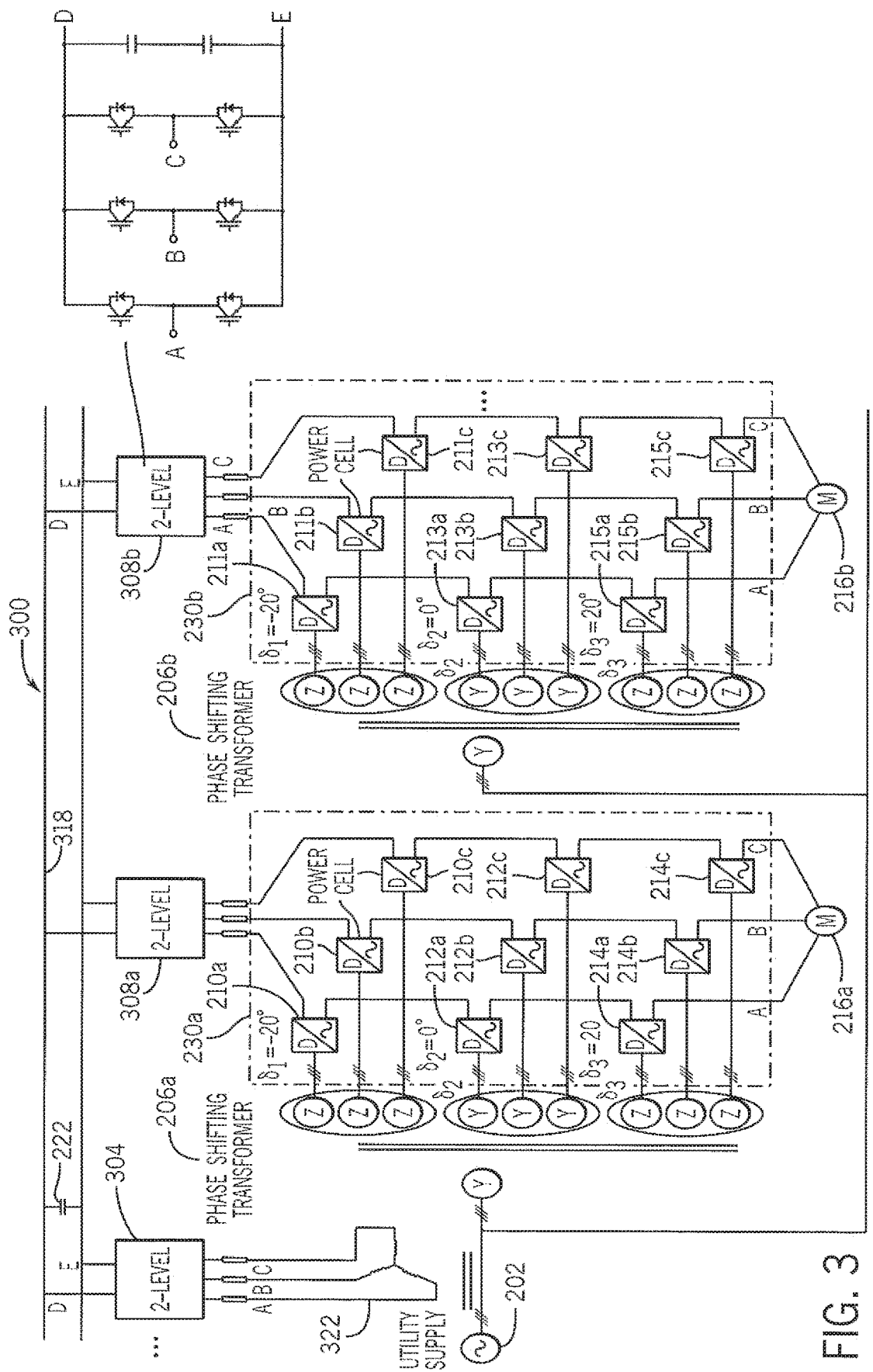
FIG. 3 is a schematic diagram of a multi-motor regenerative drive system utilizing 2-level neutral point converters according to an illustrative embodiment.

FIG. 3 is a block diagram of a multi-motor regenerative drive system 300 according to an illustrative embodiment. The multi-motor regenerative drive system 300 operates similarly as the drive system 200. The multi-motor regenerative drive system 300 includes a grid connection converter/inverter 304 and neutral point converter/inverters 308a and 308b. The grid connection converter/inverter 304 operates similarly as the grid connection converter/inverter 204. The neutral point converters/inverters 308a and 308b operates similarly as the neutral point converter/inverters 208a, and 208b as shown in FIG. 2A-FIG. 2C. The grid connection converter/inverter 304, the neutral point converter/inverters 308a and 308b are 2-level converter/inverters. The 2-level neutral point converter/inverters 308a, and 308b are configured to convert AC to DC when the corresponding motors 216a and 216b operate in a regenerative mode. The 2-level neutral point converter/inverters 308a, and 308b are configured to convert DC to AC when the corresponding motors 216a and 216b operate in a driving mode.

The 2-level neutral point converter/inverters 308a, and 308b include three AC terminals A, B, and C that connect to the neutral terminals A, B, and C of the CHB power inverter 230, respectively. The 2-level neutral point converter/inverters 308a, and 308b include two DC terminals D and E that connect to the D and E terminals of the DC bus 318, respectively.

Each of the terminals A, B, and C is connected to a node between two converter components 320. Each converter component 320 includes two diodes in series connection. Each diode has a switch connected in parallel to the diode. When the switch is switched on, the corresponding diode is bypassed. In some embodiments, each converter component 320 may include one switch. The DC bus 318 includes a capacitor 222 connected between the first terminal D and the second terminal E.

The two DC terminals D and E of the 2-level grid connection converter/inverter 304 are connected to the DC bus 318. The three AC terminals A, B, and C of the 2-level grid connecting converter/inverter 304 are connected to three terminals A, B, and C of the voltage transformer 322, respectively.

Figure 4:
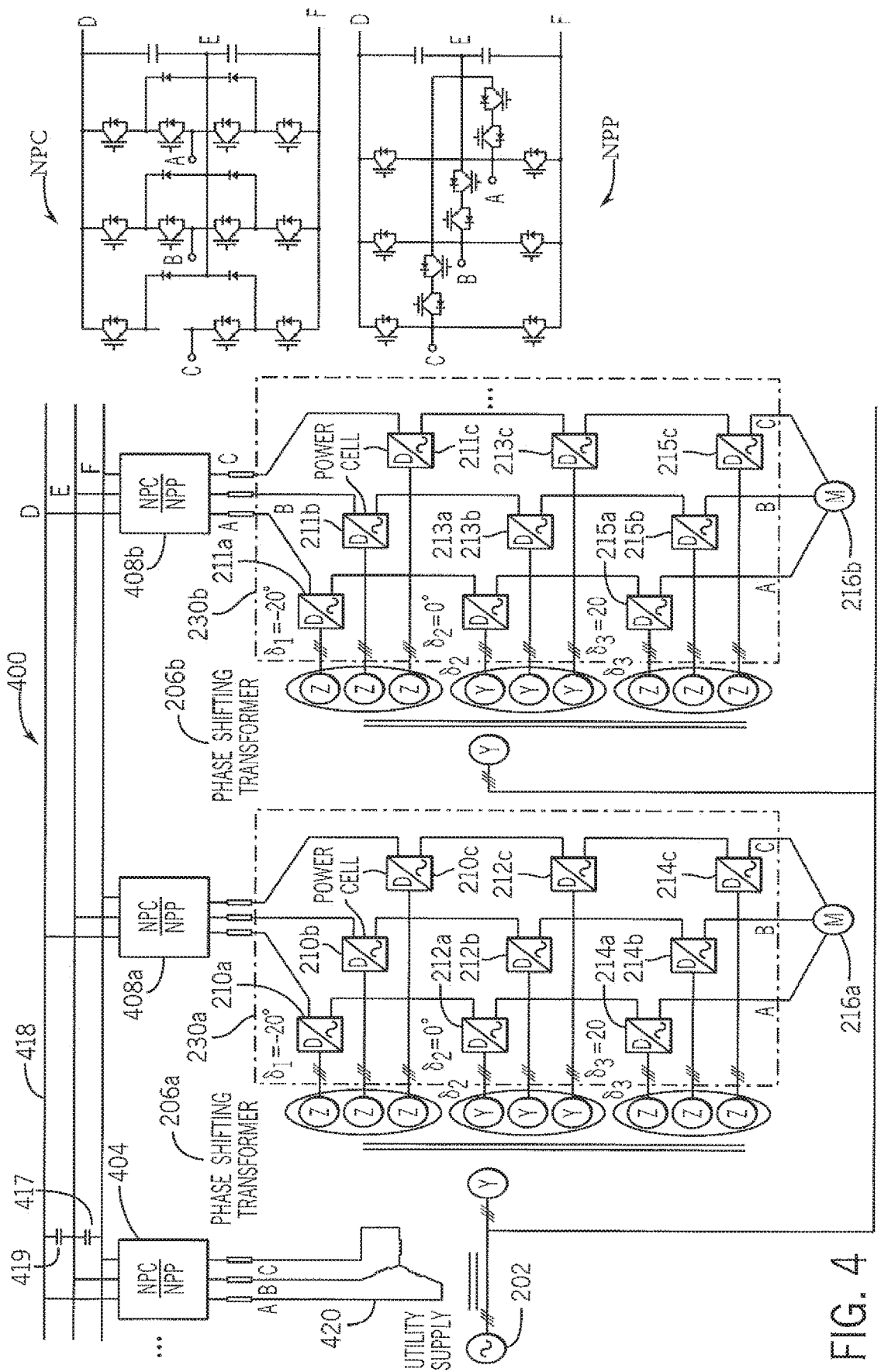
FIG. 4 is a diagram of a multi-motor regenerative drive system utilizing 3-level NPC neutral point converters according to an illustrative embodiment.

FIG. 4 is a schematic diagram of a multi-motor regenerative drive system 400 according to an illustrative embodiment. The multi-motor regenerative drive system 400 operates similarly as the drive system 200. The multi-motor regenerative drive system 400 includes a grid connection converter/inverter 404 and neutral point converter/inverters 408a and 408b. The grid connection converter/inverter 404 operates similarly as the grid connection converter/inverter 204. The neutral point converters/inverters 408a and 408b operates similarly as the neutral point converter/inverters 208a, and 208b as shown in FIG. 2A-FIG. 2C. The grid connection converter/inverter 404, the neutral point converter/inverters 408a and 408b are 3-level NPC converter/inverters. The 3-level NPC converter/inverters 408a, and 408b are configured to convert AC to DC when the corresponding motors 216a and 216b operate in a regenerative mode. The 3-level NPC converter/inverters 408a, and 408b are configured to convert DC to AC when the corresponding motors 216a and 216b operate in a driving mode.

The 3-level NPC converter/inverters 404, 408a, and 408b include three AC terminals A, B, and C, and three DC terminals D, E, and F. The AC terminals A, B, C of the converter/inverters 408a and 408b are connected to the terminals A, B, C of the CHB power inverter 230 respectively. The AC terminals A, B, C of the grid connection converter/inverter 404 are connected to the terminals A, B, C of a power transformer 420. The DC terminals D, E, F of the converter/inverters 404, 408a, and 408b are connected to terminals D, E, and F of the DC bus 418. The DC bus 418 includes a first capacitor 419 connected between the terminals D and E, and a second capacitor 417 connected between the terminals E and F.

Figure 5:
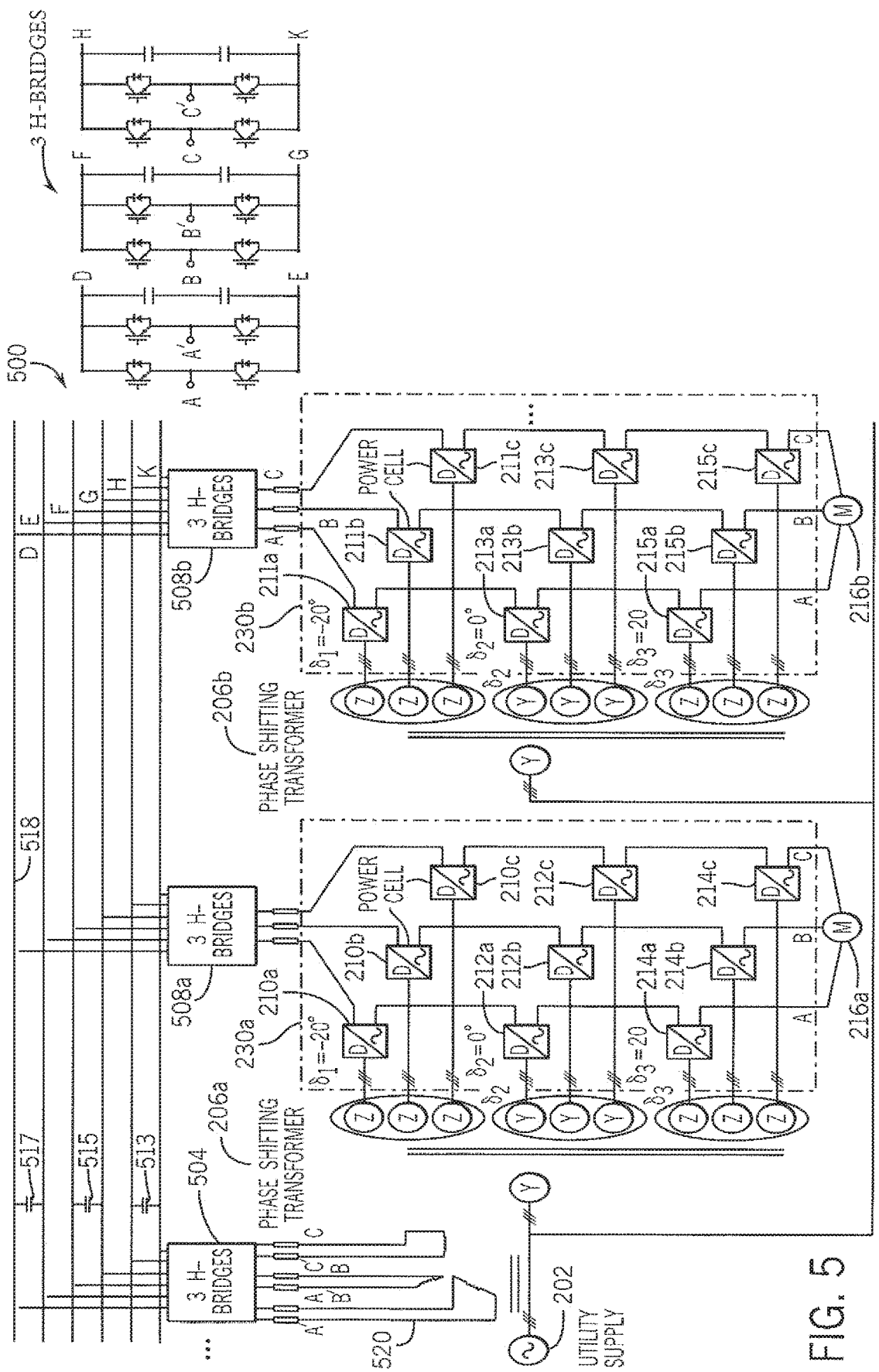
FIG. 5 is a schematic diagram of a multi-motor regenerative drive system utilizing H-bridge neutral point converters according to an illustrative embodiment.

FIG. 5 is a schematic diagram of a multi-motor regenerative drive system 500 according to an illustrative embodiment. The multi-motor regenerative drive system 500 operates similarly as the drive system 200. The multi-motor regenerative drive system 500 includes a grid connection converter/inverter 504 and neutral point converter/inverters 508a and 508b. The grid connection converter/inverter 504 operates similarly as the grid connection converter/inverter 204. The neutral point converters/inverters 508a and 508b operates similarly as the neutral point converter/inverters 208a, and 208b as shown in FIG. 2A-FIG. 2C. The grid connection converter/inverter 504, the neutral point converter/inverters 508a and 508b are 3 H-bridges converter/inverters. The 3 H-bridges neutral point converter/inverters 508a, and 508b are configured to convert AC to DC when the corresponding motors 216a and 216b operate in a regenerative mode. The 3 H-bridges neutral point converter/inverters 508a, and 508b are configured to convert DC to AC when the corresponding motors 216a and 216b operate in a driving mode.

The 3 H-bridges converter/inverters 504, 508a, and 508b include three AC terminals A, B, and C, six DC terminals D, E, F, G, H, and K, and three neutral terminals A', B', and C'. The AC terminals A, B, C of the 3 H-bridges neutral point converter/inverters 508a and 508b are connected to the terminals A, B, C of the CHB power inverter 230, respectively. The neutral terminals A', B', and C' of the 3 H-bridges neutral point converter/inverters 508a and 508b are connected together. The terminals A and A' of the 3 H-bridges grid connection converter/inverter 504 are connected to a first coil of the phase transformer 520. The terminals B and B' of the 3 H-bridges grid connection converter/inverter 504 are connected to a second coil of the phase transformer 520. The terminals C and C' of the 3 H-bridges converter/inverter 504 are connected to a third coil of a phase transformer 520. The DC terminals D, E, F, G, H, and K of the 3 H-bridges converter/inverters 504, 508a, and 508b are connected to terminals D, E, F, G, H, and K of the DC bus 518. The DC bus 518 includes a first capacitor 517 connected between the terminals D and E, a second capacitor 515 connected between the terminals G and F, and a third capacitor 517 connected between the terminals H and K.

In some embodiments, the inverters 210a, 210b, and 210c of the CHB power inverter 230a may be integrated in the 3 H-bridges converter/inverter 508a. Similarly, the inverters 211a, 211b, and 211c of the CHB power inverter 230b may be integrated in the 3 H-bridges converter/inverter 508b. The integration of inverters to the 3 H-bridges converter/inverter 508 enables the drive system 500 to operate in the same way described above but with less inverters.

Figure 6:
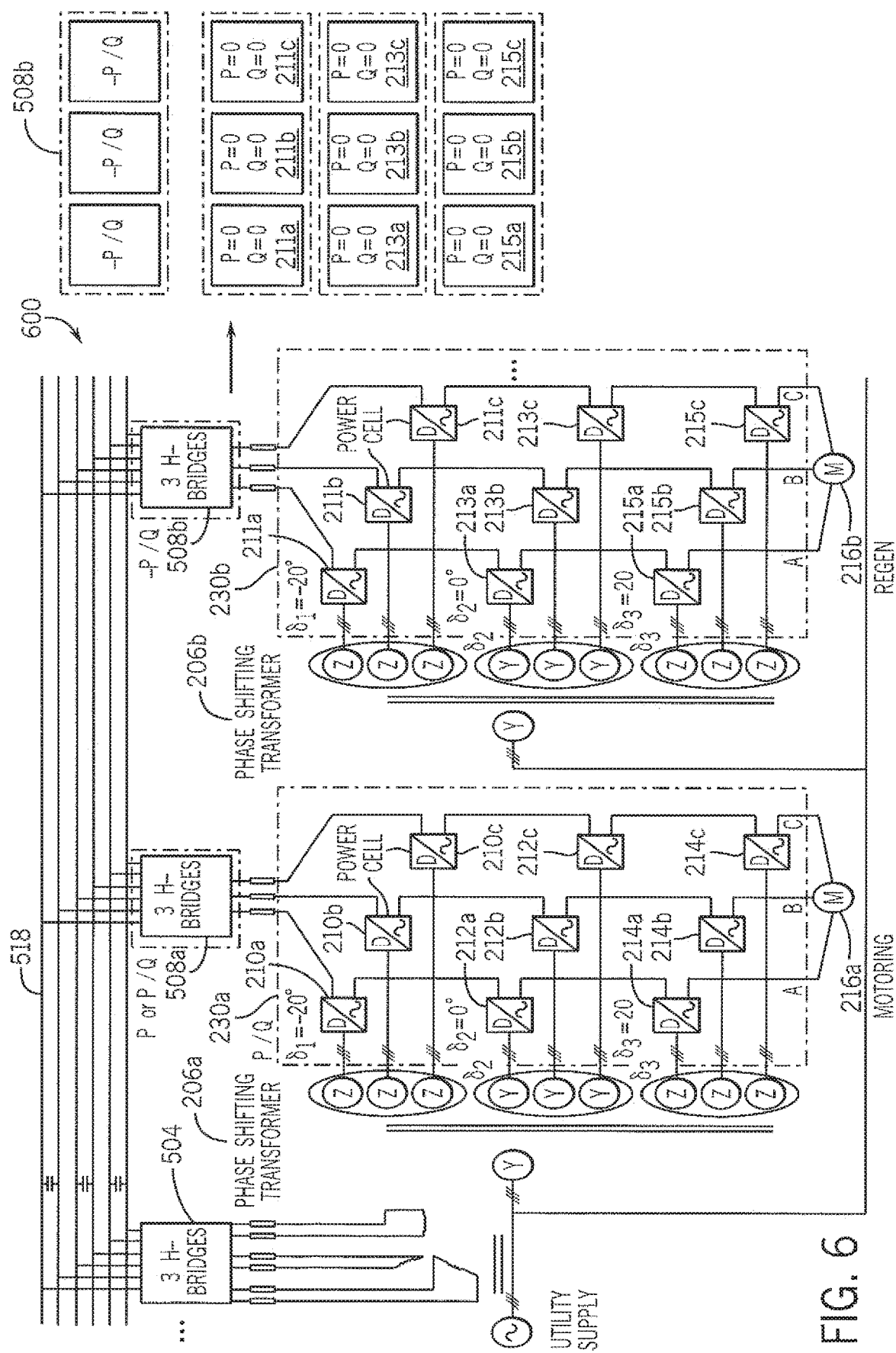
FIG. 6 is a schematic diagram showing a power control scenario for a drive system according to an illustrative embodiment.

In some embodiments, each of the 3 H-bridges converter/inverters 504, 508a, and 508b is controlled by a controller (not shown). In this way, each 3 H-bridges converter/inverter can be configured as a converter or an inverter based on an operating mode of a respective motor that is connected to the 3 H-bridges converter/inverter through a CHB power inverter 230. Each 3 H-bridges converter/inverter can also be configured to generate active power and/or reactive power to drive the motors. For example, FIG. 6 shows a power control scenario for a drive system 600 according to an illustrative embodiment. The drive system 600 includes components similar as the drive system 500. In this power control scenario, when the motor 216 (e.g., motor 216b) operates in a regenerative mode, the CHB power inverter 230 (e.g., CHB power inverter 230b) is controlled to not generate either active power or reactive power. In other words, the CHB power inverter 230b allows the regenerative power generated from the motor 216b to pass and direct the regenerative power to the neutral point converter/inverter 508b. The neutral point converter/inverter 508b is controlled to generate both active and reactive power.

When the motor 216 (e.g., motor 216a) operates in a driving mode, the CHB power inverter 230 (e.g., CHB power inverter 230a) is controlled to generate both active power and reactive power. The neutral point converter/inverter 508a is controlled to generate active power only or generate both active and reactive power.

Figure 7:
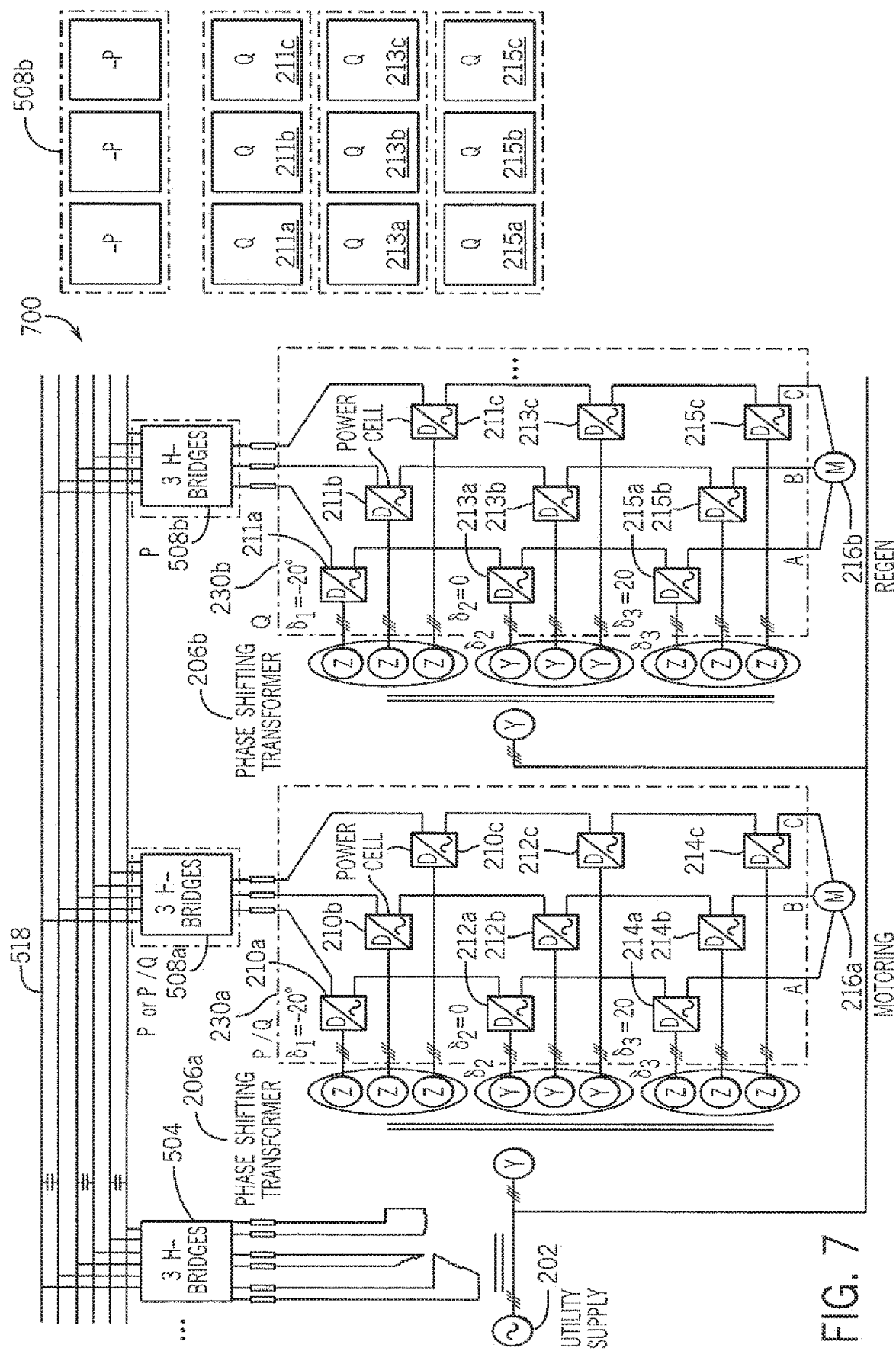
FIG. 7 is a schematic diagram showing a power control scenario for a drive system according to an illustrative embodiment.

FIG. 7 shows a power control scenario for a drive system 700 according to an illustrative embodiment. The drive system 700 includes components similar as the drive system 500. In this power control scenario, when the motor 216 (e.g., motor 216b) operates in a regenerative mode, the CHB power inverter 230 (e.g., CHB power inverter 230b) is controlled to generate reactive power. The neutral point converter/inverter 508 (e.g., neutral point converter/inverter 508b) is controlled to generate active power.

When the motor 216 (e.g., motor 216a) operates in a driving mode, the CHB power inverter 230 (e.g., CHB power inverter 230a) is controlled to generate both active power and reactive power. The neutral point converter/inverter 508a is controlled to generate active power only or generate both active and reactive power.

Figure 8:
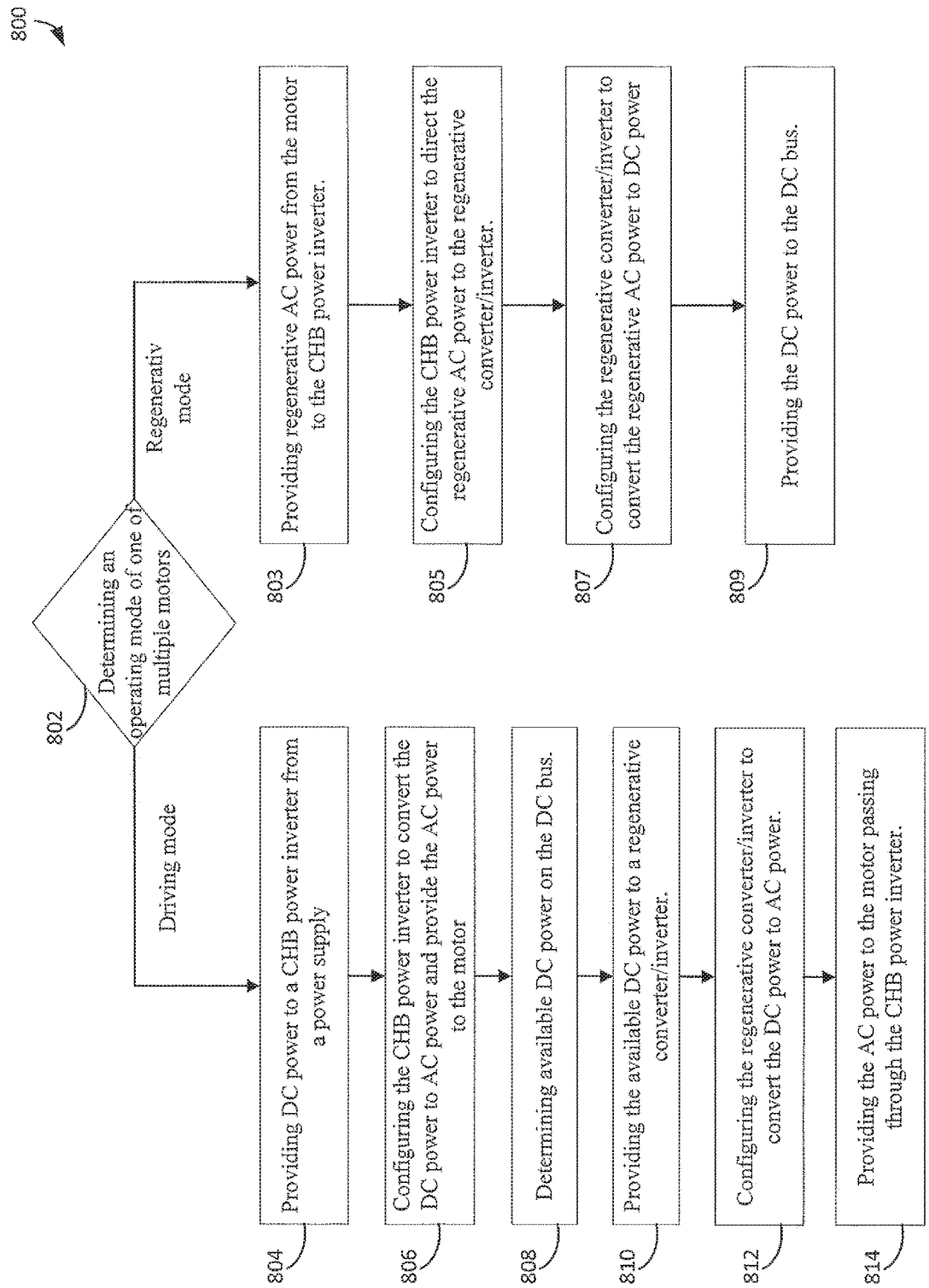
FIG. 8 is a flow chart of a control process of a multi-motor drive system according to an illustrative embodiment.

FIG. 8 is a flow chart of a control process 800 of a multi-motor drive system. The multi-motor drive system is similar as the drive system 200 as describe in FIG. 2A. At step 802, the multi-motor drive system determines an operating mode for each of the multiple motors. Upon determining that a motor operates in a driving mode, the multi-motor drive system process steps 804, 806, 808, 810, 812, and 814.

At step 804, the multi-motor drive system provides DC power to a CHB power inverter from a power supply. The CHB power inverter includes one or more DC terminals to receive the DC power from the power supply.

At step 806, the multi-motor drive system configures the CHB power inverter to convert the DC power to AC power and provide the AC power to the motor. The CHB power includes one or more AC terminals connected to the motor and transmits the AC power to the motor via the AC terminals.

At step 808, the multi-motor drive system determines whether there are available DC power on the DC bus. The DC bus is connected to the CHB power inverter through a neutral point converter/inverter.

At step 810, upon determining there is available DC power on the DC bus, the multi-motor drive system provides the available DC power to the neutral point converter/inverter. The DC power on the DC bus may be generated by one or more other motors that operate in a regenerative mode.

At step 812, the multi-motor drive system configures the neutral point converter/inverter to convert the DC power to AC power. The neutral point converter/inverter is connected to one or more neutral terminals of the CHB power inverter.

At step 814, the multi-motor drive system provides the AC power to the motor passing through the CHB power inverter. The multi-motor drive system configures the CHB to direct the AC power from the neutral point converter/inverter to the motor.

In some embodiments, When the motor operates in the driving mode, the multi-motor drive system configures the CHB power inverter to generate both active and reactive power and configures the neutral point converter/inverter to generate active power or generate both active and reactive power.

Upon determining that a motor operates in a driving mode, the multi-motor drive system process steps 803, 805, 807, and 809. At step 803 the multi-motor drive system provides regenerative AC power from the motor to the CHB power inverter. At step 805, the multi-motor drive system configures the CHB power inverter to direct the regenerative AC power to the neutral point converter/inverter. At step 807, the multi-motor drive system configures the neutral point converter/inverter to convert the AC power to DC power. In some embodiments, the CHB power inverter is configured to receive the regenerative AC power from the motor via the one or more AC terminals and transmits the AC power to the neutral point converter/inverter via the one or more neutral terminals. In some embodiments, the CHB power inverter is configured to not generate either active or reactive power and the neutral point converter/inverter is configured to generate both active and inactive power. In some other embodiments, the CHB power inverter is configured to generate inactive power and the neutral point converter/inverter is configured to generate active power. At step 809, the multi-motor drive system provides the DC power to the DC bus.

In some embodiments, the neutral point converter/inverter can be any suitable type of converter/inverters, such as 3-H bridge converter/inverter, 2-Level converter/inverter, NPC converter/inverter, NPP converter/inverter etc.

Figure 9:
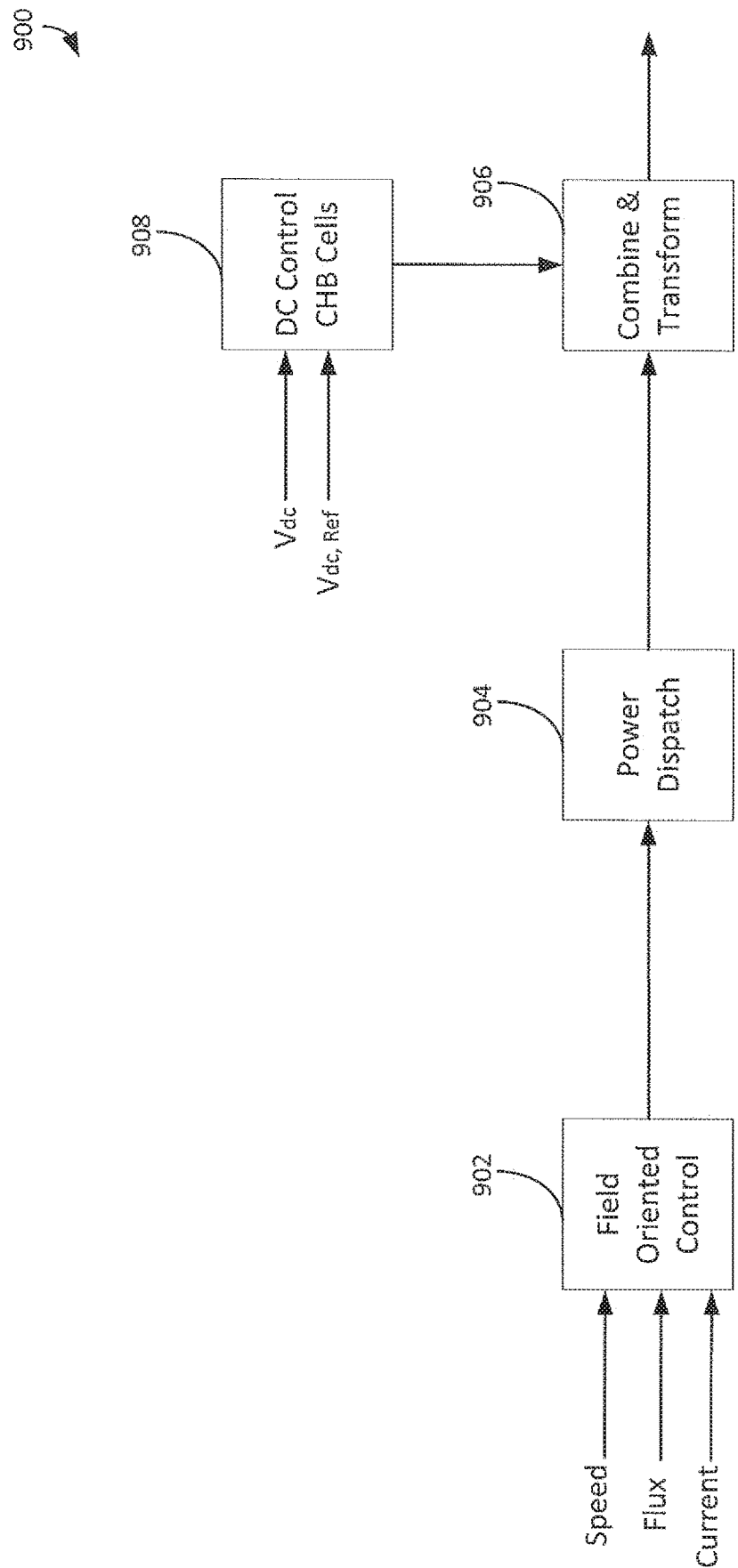
FIG. 9 is a block diagram of a control system for a multi-motor drive system according to an illustrative embodiment.

FIG. 9 is a block diagram of a control system 900 for a multi-motor drive system according to an illustrative embodiment. The control system 900 may be used in any of the multi-motor drive system described herein. The control system 900 includes a field oriented control module 902, a power dispatch module 904, a combination and transformation module 906, and a DC control CHB cells module 908. The control system 900 enables the multi-motor drive system to operate in both power regenerative scenario and power drive scenario. The control system 900 controls regenerative power to flow through the CHB cells and the neutral point converters to the DC bus without flowing back into the CHB cells.

The field oriented control module 902 is configured to receive speed, current, and flux as inputs and generates a modulation index in DQ-frame (e.g., synchronous reference frame theory) for each CHB cell and the neutral converter/inverter. The field oriented control module is further configured to generate a current angle using the speed, current, and flux.

Figure 10:
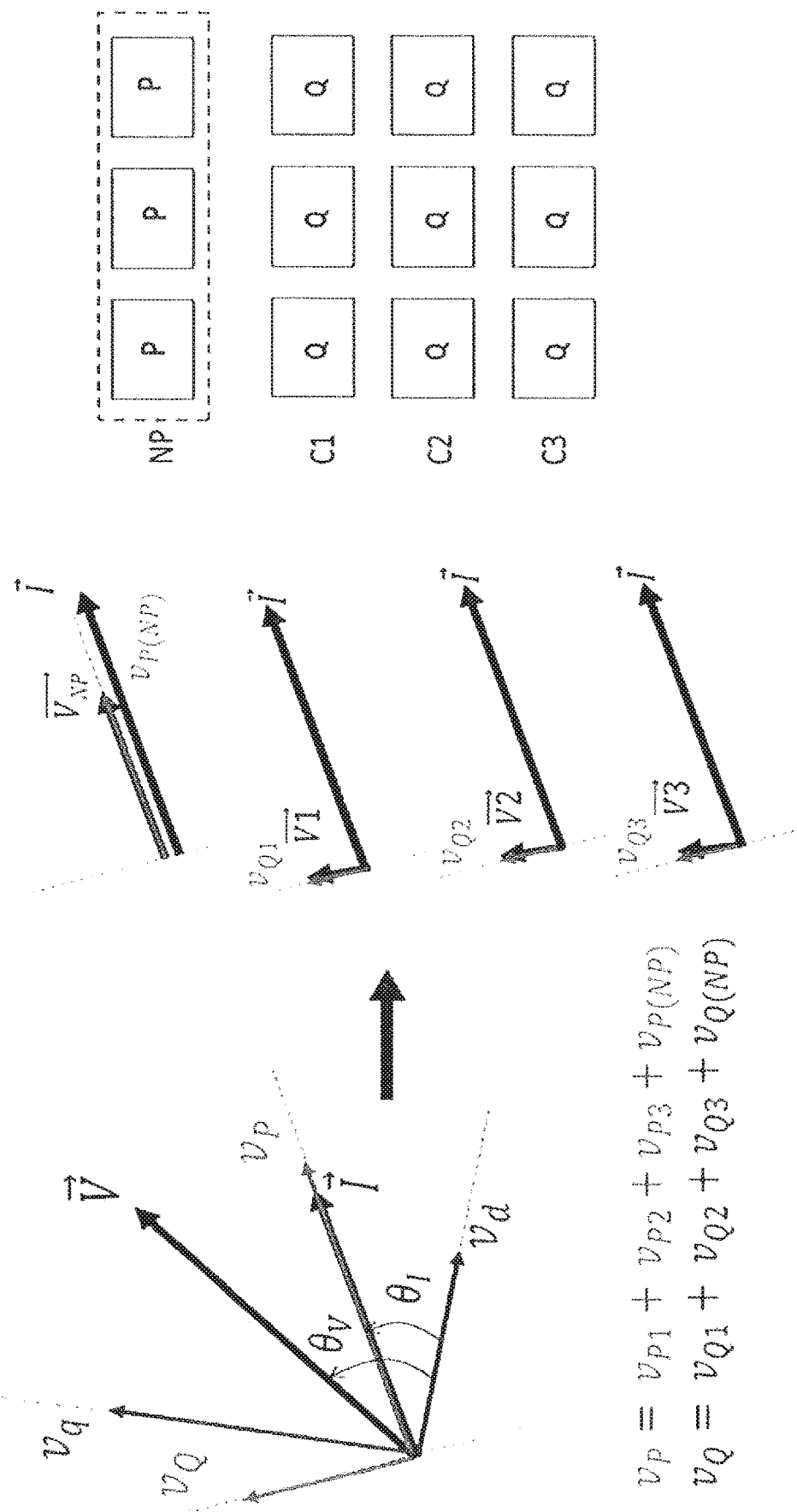
FIG. 10 is a schematic diagram of a power dispatch operation during regeneration for three cells per phase partial regenerative CHB drive according to an illustrative embodiment.

The power dispatch module 904 is configured to receive the modulation index and the current angle from the field oriented control module 902. The power dispatch module 904 is configured to reorient the modulation index from the DQ-frame to PQ-frame (e.g., instantaneous real and imaginary power theory) using the current angle as shown in FIG. 10. During regeneration (e.g., when a respective motor operates in regenerative mode), the CHB cells (e.g., CHB inverters) are dispatched by the power dispatch module 904 to generate reactive power (Q) while the neutral point converter/inverter is dispatched to produce active power (P). In the PQ-frame, the CHB cells are configured to generate modulation index aligned with Q-axis to generate reactive power, and the neutral point converter/inverter is configured to generate modulation index aligned with P-axis to generate active power.

The combination and transformation module 906 is configured to combine the modulation indexes from the CHB cells and transform the combined modulation index to ABC-frame (e.g., ABC reference frame). The combination and transformation module 906 is configured to provide the transformed modulation index to a CHB phase-shifted modulator. The combination and transformation module 906 is further configured to transform the modulation index of the neutral point converter/inverter to ABC-frame and provide the transformed modulation index to a respective modulator.

Figure 11:
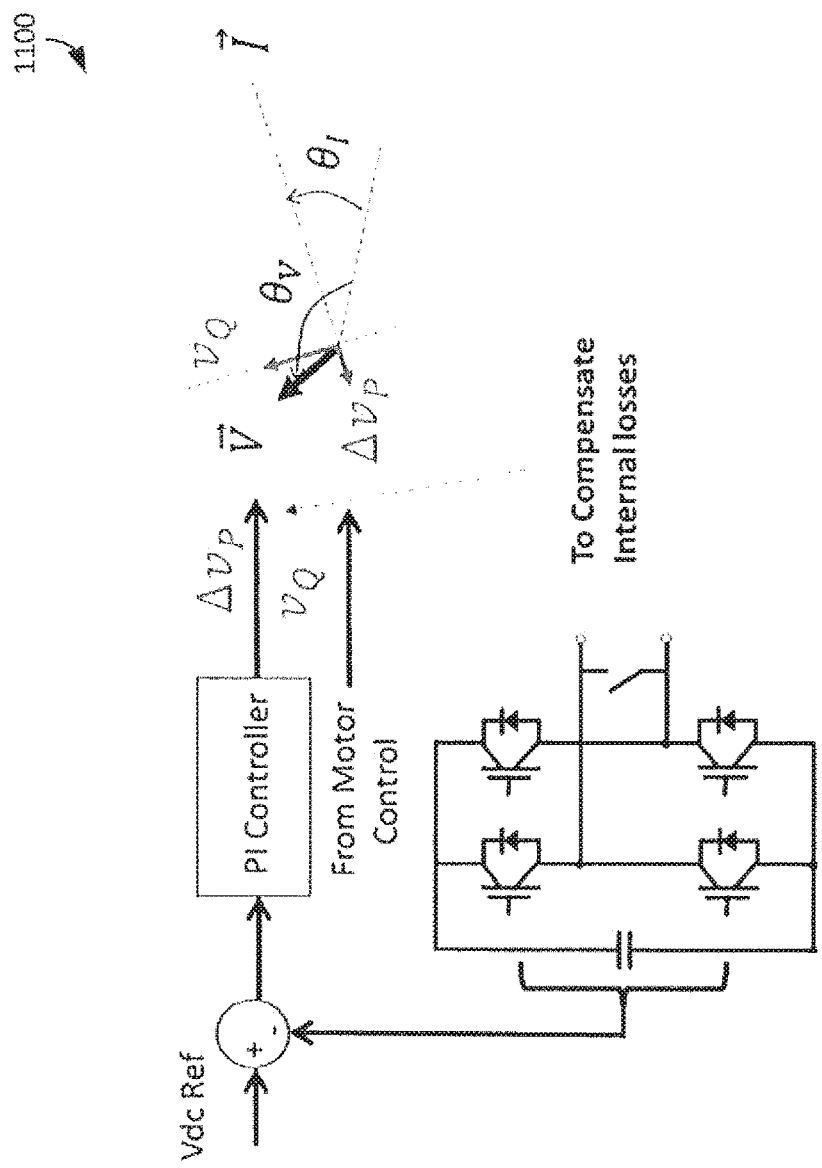
FIG. 11 is a schematic diagram of a voltage regulation operation during regeneration for three cells per phase partial regenerative CHB drive according to an illustrative embodiment.

The DC control CHB cells module 908 is configured to regulate CHB cells DC voltage against inaccuracies in the dispatch process and dynamic transitions. The DC control CHB cells module 908 includes multiple DC-bus regulators 1100 as shown in FIG. 11. Each DC-bus regulator 1100 is associated with a CHB inverter (e.g., cell). Each DC-bus regulator 1100 is configured to regulate a respective CHB cell DC voltages by modifying modulation index received from the power dispatch module 904 as shown in FIG. 11. The DC control CHB cells module 908 provides the modified modulation index to the combination and transformation module 906 and further to the modulator.

Figure 12:
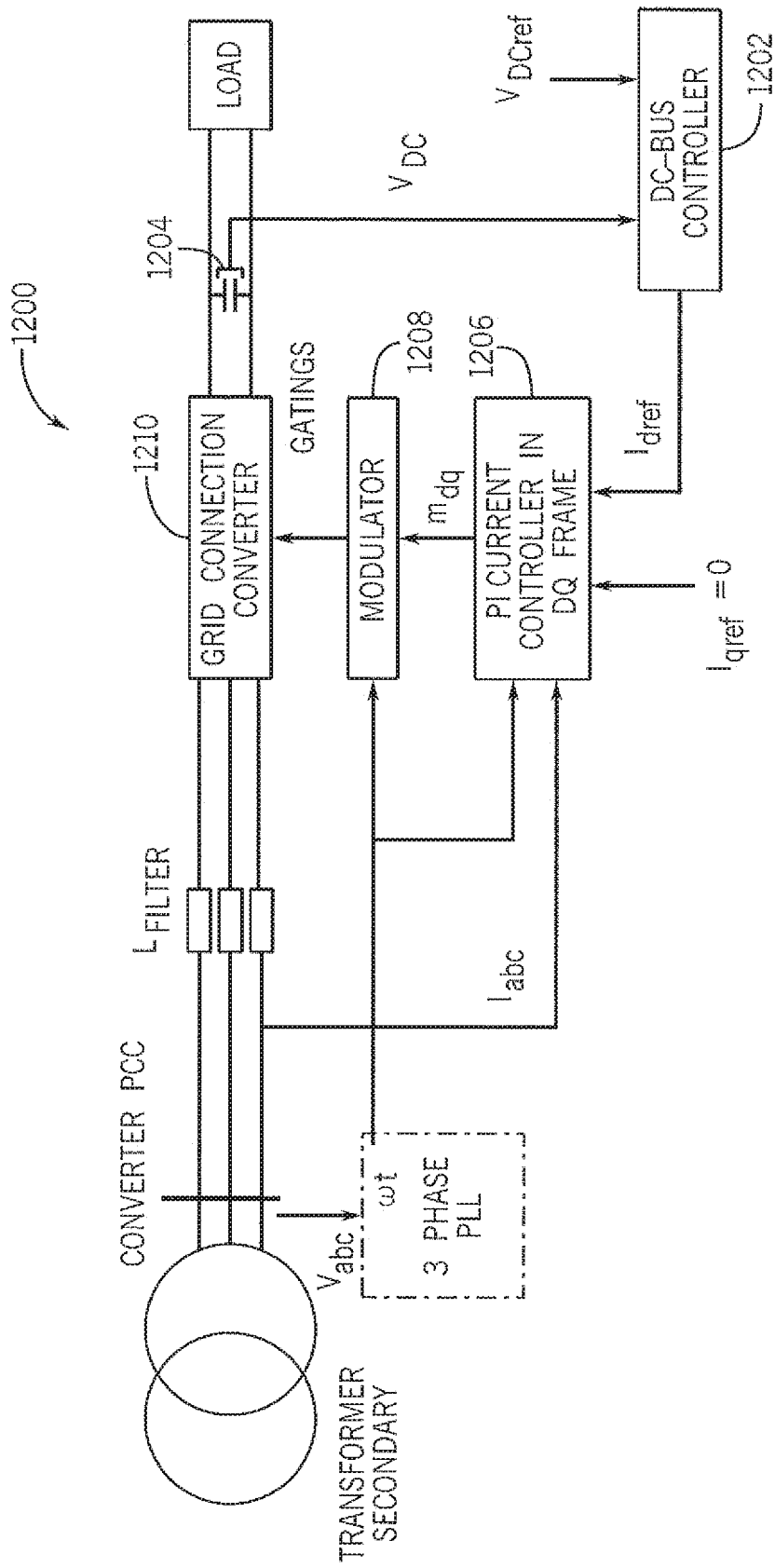
FIG. 12 is a block diagram of a control system for regulating voltage on a DC-bus that is connected to three phase converters according to an illustrative embodiment.

FIG. 12 is a block diagram of a control system 1200 for regulating voltage on a DC-bus (e.g., DC-bus 318 in FIG. 3, DC-bus 418 in FIG. 4) that is connected to three phase converters (e.g., neutral point converters 304, 308 in FIG. 3 or 404, 408 in FIG. 4) according to an illustrative embodiment. The control system 1200 includes a DC-bus controller 1202, a proportional-integral (PI) current controller 1206, a modulator 1208, and a grid connection converter 1210. The DC-bus controller 1202 is configured to compare a voltage measured at the DC-bus (e.g., voltage at a capacitor 1204 at the DC-bus) with a reference voltage. The DC-bus controller 1202 is further configured to generate a current $I_{d\_ref}$ based on the comparison. The DC-bus controller 1202 is connected to the PI current controller 1206. The DC-bus controller 1202 provides the current $I_{d\_ref}$ to the PI current controller 1206. The PI current controller 1206 utilizes a current control algorithm implemented in DQ-frame using input $I_{d\_ref}$, $I_{q\_ref}$, and three phase phase-locked loop (PLL) to generate a modulation index $m_{dq}$. In some embodiments, $I_{q\_ref}$ is set to zero. The modulation index $m_{dq}$ is provided to the modulator 1208. In some embodiments, an angle associated with eh PLL is used to convert the modulation index from DQ-frame to ABC-frame. The modulation index in ABC-frame is further provided to the modulator 1208. The modulator 1208 is configured to generate a gating signal and provide the gating signal to the grid connection converter (e.g., neutral point 2 level converter). In some embodiments, a DC bus mid-point voltage control algorithm is applied for an NPC or NNP neutral point converter.

Figure 13:
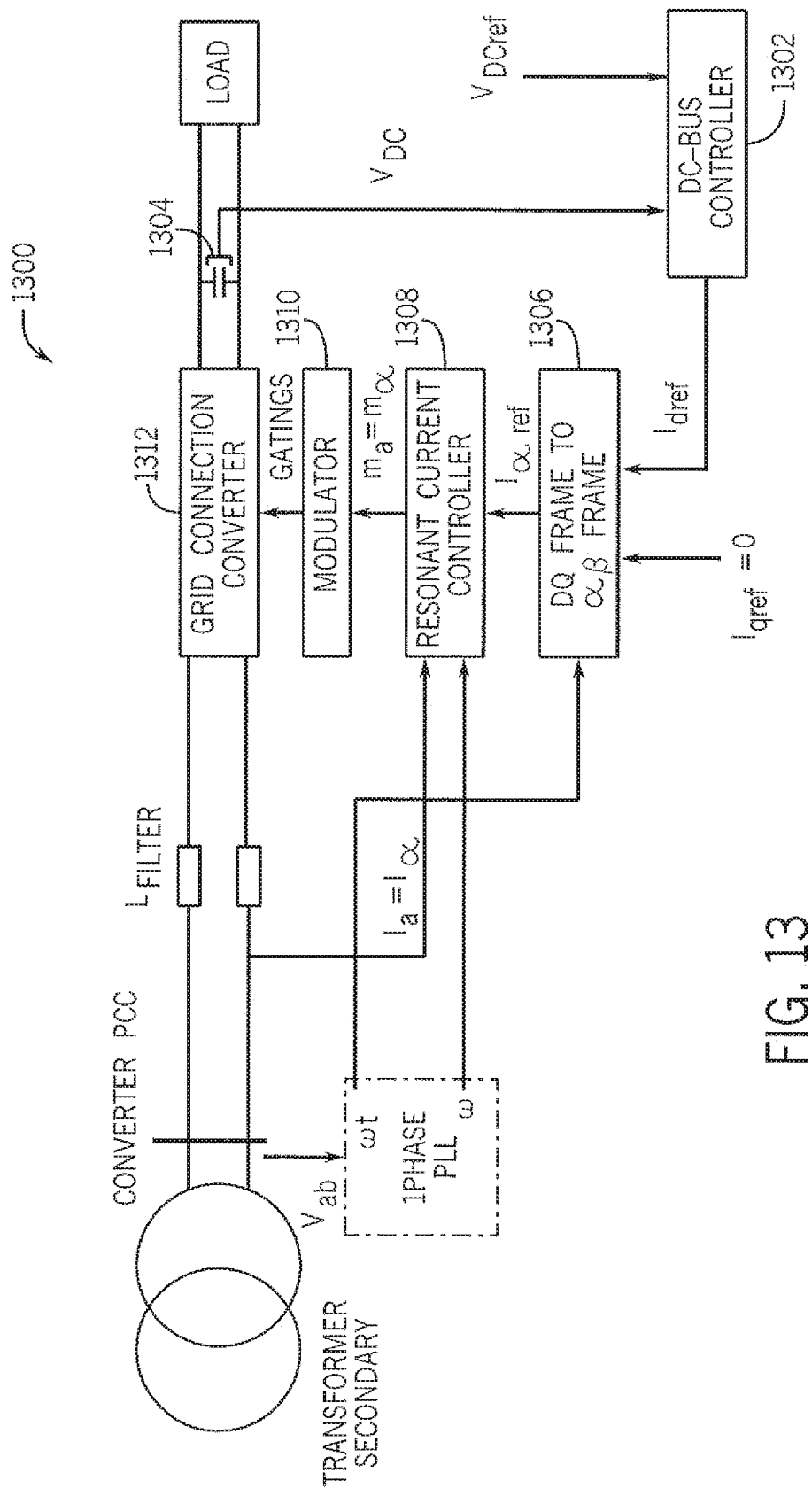
FIG. 13 is a block diagram of a control system for regulating voltage on a DC-bus that is connected to single phase H-bridges converters according to an illustrative embodiment.

FIG. 13 is a block diagram of a control system 1300 for regulating voltage on a DC-bus (e.g., DC-bus 518 in FIGS. 5-7) that is connected to single phase H-bridges converters (e.g., 3 H-bridges converters 508a, 508b in FIGS. 5-7) according to an illustrative embodiment. The control system 1300 includes a DC-bus controller 1302, a DQ frame to αβ frame module 1306, a resonant current controller 1308, a modulator 1310, and a grid connection converter 1312. The DC-bus controller 1302 is configured to compare a voltage measured at the DC-bus (e.g., voltage at a capacitor 1304 at the DC-bus) with a reference voltage. The DC-bus controller 1302 is further configured to generate a current $I_{d\_ref}$ based on the comparison. The DC-bus controller 1302 is connected to the DQ frame to αβ frame module 1306. The DC-bus controller 1302 provides the current $I_{d\_ref}$ to the DQ frame to αβ frame module 1306. The DQ frame to αβ frame module 1306 converts the current from DQ frame to αβ frame and provides the current Ia ref in αβ frame to the resonant current controller 1308. The resonant current controller 1308 utilizes a current control algorithm using input $I_{\alpha\ ref}$, $I_{\alpha}$, and 1 phase PLL to generate a modulation index $m_\alpha$. The 1 phase PLL is used to provide angle information to convert DQ-frame to αβ-frame. The modulation index $m_\alpha$ is provided to the modulator 1310. The modulator 1310 is configured to generate a gating signal and provide the gating signal to the grid connection converter 1312 (e.g., 3 H-bridges converters 508a, 508b).

Figure 14:
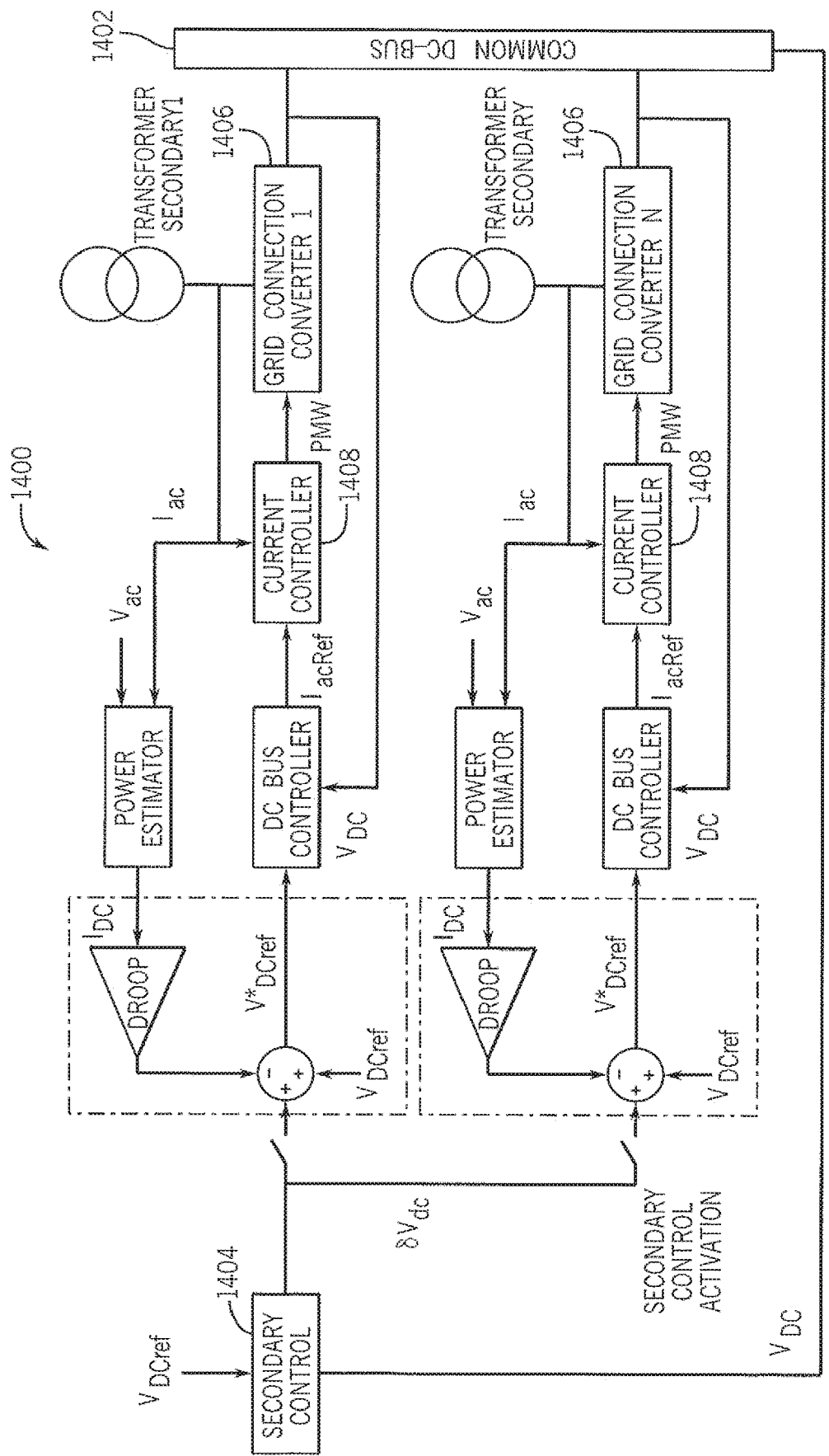
FIG. 14 is a block diagram of a control system of the multi-motor regenerative drive system of FIG. 2 with multiple grid connection units according to an illustrative embodiment.

FIG. 14 is a block diagram of a control system 1400 of the multi-motor regenerative drive system 200 with multiple grid connection units according to an illustrative embodiment. The control system 1400 is configured to control multiple grid connection units (e.g., NPC, NPP, or 3-H bridges converters) in order to regulate the common DC bus. The control system 1400 is configured to allow power transaction between the DC bus and the CHB drives. The control system 1400 includes a secondary controller 1404 and multiple current controllers 1406. Each current controller 1406 is configured for a respective neutral point converter 1406. The neutral point converter 1406 is similar as the neutral point converters discussed above, such as the neutral point converters 208a or 208b, etc. Each current controller 1406 is installed on a converter control board of a respective neutral point converter. The secondary controller 1404 is a centralized controller connected to one of the multiple current controllers 1406. Each current controller 1406 is decentralized droop controller that enables power sharing during transients and steady state. The secondary controller 1404 is a slow acting control loop configured to restore DC bus voltage to its reference value at steady state. The secondary controller 1404 is configured to be deactivated in applications characterized by frequent dynamic changes.

The subject matter as described above includes various exemplary aspects. However, it should be appreciated that it is not possible to describe every conceivable component or methodology for purposes of describing these aspects. One of ordinary skill in the art can recognize that further combinations or permutations can be possible. Various methodologies or architectures can be employed to implement the various embodiments, modifications, variations, or equivalents thereof. Accordingly, all such implementations of the aspects described herein are intended to embrace the scope and spirit of subject claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for driving multiple motors, comprising:
multiple cascaded H-bridge (CHB) power inverters, wherein each of the multiple CHB power inverters is connected to a respective motor at one or more alternating current (AC) terminals of the CHB power inverter, wherein each of the multiple CHB power inverters comprises one or more direct current (DC) terminals configured to receive DC power;
a DC bus; and
multiple neutral point converter/inverters, wherein each of the multiple neutral point converter/inverters is connected between a respective CHB power inverter at one or more neutral terminals of the respective CHB power inverter and the DC bus.

2. The system of claim 1, wherein the one or more DC terminals of each of the multiple CHB power inverters are connected to a power supply.

3. The system of claim 2, further comprises multiple phase shifting transformers, wherein each of the multiple phase shifting transformers is connected between the power supply and the one or more DC terminals of a respective CHB power inverter.

4. The system of claim 2, further comprises a grid connection converter/inverter connected between the power supply and the DC bus.

5. The system of claim 1, wherein the multiple neutral point converter/inverters are 2-level converter/inverters, wherein each of the multiple 2-level converter/inverters comprises three AC terminals connected to a respective CHB power inverter and two DC terminals connected to the DC bus.

6. The system of claim 1, further comprises a control system configured to control power transaction between the DC bus and the multiple neutral point converter/inverters and power transaction between the multiple CHB power inverters and the multiple neutral point converter/inverters.

7. The system of claim 6, wherein, when a motor operates in a regenerative mode, a respective CHB power inverter is configured to produce reactive power and a respective neutral point converter/inverter is configured to produce active power.

8. The system of claim 1, wherein the multiple neutral point converter/inverters are neutral point clamped converters (NPC) wherein each of the multiple NPC converter/inverters comprises three AC terminals connected to a respective CHB power inverter and three DC terminals connected to the DC bus.

9. The system of claim 7, wherein the multiple neutral point converter/inverters are 3-level NPCs.

10. The system of claim 1, wherein the multiple neutral point converter/inverters are 3 H-bridges converter/inverters.

11. The system of claim 9, wherein each of the multiple 3 H-bridges converter/inverters comprises three AC terminals connected to a respective CHB power inverter and six DC terminals connected to the DC bus.

12. The system of claim 1, wherein the DC bus comprises one or more capacitors.

13. A system for driving multiple motors, comprising:
a first cascaded H-bridge (CHB) power inverter connected between a first motor and a first neutral point converter/inverter, wherein the first motor is configured to operate in a driving mode;
a second CHB power inverter connected between a second motor and a second neutral point converter/inverter, wherein the second motor is configured to operate in a regenerative mode; and
a direct current (DC) bus, wherein the DC bus is connected to the first and the second neutral point converter/inverters,
wherein the first CHB power inverter is configured to:
receive DC power from a power supply and/or alternating current (AC) power from the first neutral point converter/inverter,
convert the DC power to AC power, and
provide AC power to the first motor,
wherein the second CHB power inverter is configured to:
receive regenerative power from the second motor, and
direct the regenerative power to the second neutral point converter/inverter, and
wherein the second neutral point converter/inverter is configured to convert the regenerative power to DC power and provide the DC power to the DC bus.

14. The system of claim 13, further comprises a grid connection converter/inverter connected between the DC bus and the power supply.

15. The system of claim 14, wherein the grid connection converter/inverter is configured to converter DC power received from the DC bus to AC power and provide the AC power to the power supply.

16. The system of claim 15, wherein the grid connection converter/inverter is configured to convert AC power received from the power supply to DC power and provide the DC power the DC bus.

17. The system of claim 13, wherein the first neutral point converter/inverter is configured to:
receive DC power from the DC bus when there is DC power available one the DC bus;
convert the DC power to AC power; and
provide the AC power to the first CHB power inverter.

18. The system of claim 17, wherein the DC power on the DC bus is regenerative power from the second motor.

19. A method of controlling a multi-motor drive system, comprising:
determining an operating mode for each of multiple motors;
in response to determining that one or more first motors of the multiple motors operate in a regenerative mode and one or more second motors of the multiple motors operate in a driving mode,
providing regenerative power from the one or more first motors to a direct current (DC) bus through one or more respective first cascaded H-bridge (CHB) power inverters and one or more respective first neutral point converter/inverters connected between the one or more first motors and the DC bus; and
providing power to the one or more second motors from a power supply and from the DC bus.

20. The method of claim 19, wherein providing power to the one or more second motors from a power supply and from the DC bus comprises:
providing power to the one or more second motors from the power supply through one or more respective second CHB power inverters connected between the power supply and the one or more second motors; and
providing power to the one or more second motors from DC bus through the one or more respective second CHB power inverters and one or more respective second neutral point converter/inverters connected between the one or more second motors and the DC bus.

* * * * *